No. 782,067. PATENTED FEB. 7, 1905.
W. W. SHELBY & D. W. CUMMINGS.
DEVICE FOR CATCHING SHELL FISH.
APPLICATION FILED SEPT. 8, 1904.
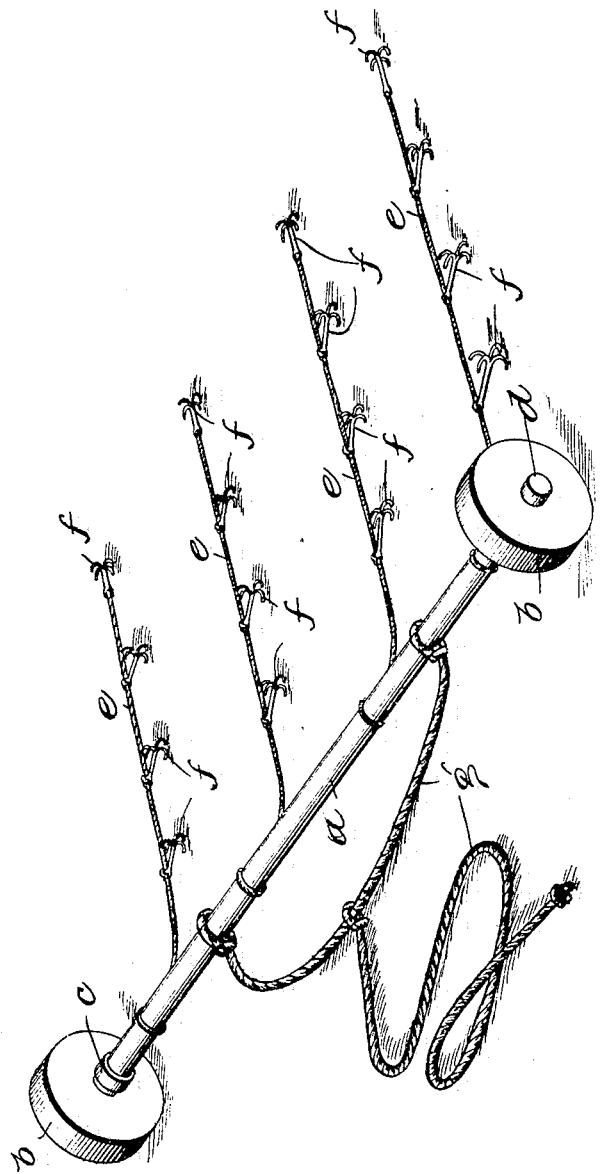

No. 782,067.

Patented February 7, 1905.

UNITED STATES PATENT OFFICE.

WILLIAM W. SHELBY AND DORELL W. CUMMINGS, OF HENDERSON, KENTUCKY.

DEVICE FOR CATCHING SHELL-FISH.

SPECIFICATION forming part of Letters Patent No. 782,067, dated February 7, 1905.

Application filed September 8, 1904. Serial No. 223,743.

*To all whom it may concern:*

Be it known that we, WILLIAM W. SHELBY and DORELL W. CUMMINGS, citizens of the United States, residing at Henderson, in the county of Henderson and State of Kentucky, have invented certain new and useful Improvements in Devices for Catching Shell-Fish; and we do hereby declare the following to be a full, clear, and exact description of the invention, such as will enable others skilled in the art to which it appertains to make and use the same.

This invention relates to a device for catching shell-fish, more particularly for catching mussels; and the objects of the invention are to construct a device that will successfully and advantageously perform the functions required of it and at the same time be simple though durable, combining therewith cheapness of manufacture.

To the accomplishment of these objects and such others as may hereinafter appear the invention comprises the novel construction and combination of parts hereinafter described, and particularly pointed out in the appended claims.

The preferred embodiment of the invention is disclosed by the accompanying drawing, showing a perspective view of the device in operative position.

In fishing for mussels with this device it is used in the nature of a drag. Mussels ordinarily lie on the bottom of rivers and other bodies of water, facing in the direction of the current or upstream, with their shells open in order to feed. When in this condition, if touched by any foreign moving object they at once close their shells, and should the object come between their shells it will be caught by their closure. It is because of this characteristic of the mussels that a drag is used, the object being to place between their open shells a hook or other object attached to a line that can be hauled in, and thus secure the catch.

Referring to the drawing, the drag used is seen to consist, essentially, of a cross-bar provided with a series of rearwardly-extending hooks or other suitable devices adapted to enter the open shells of the mussels, which are here termed the "baiters." More particularly, *a* is a bar, preferably from ten to fifteen feet in length, of some heavy material capable of being kept from floating by its own weight, a convenient substance being a piece of ordinary piping, preferably of about three-fourths inch diameter, which may be galvanized to keep it from rusting. On each end of the bar *a* there is mounted means for enabling the bar to ride a distance from the ground, here shown as a wheel *b*, which may be formed of any suitable material and are preferably about four to eight inches in diameter. To keep these wheels from riding inwardly on the bar *a*, any suitable means may be used; but in practice a convenient method has been found to be to mount upon each end of the bar *a* a reducing-coupling *c*, into the outer ends of which are screwed small sections of piping of smaller diameter than the rod *a*—say one-half inch—which serve as axles for the wheels *b*. On the outer ends of these axles are placed any suitable means for holding the wheels thereon, here shown as screw-caps *d*, which also prevent water entering the interior of the piping. Extending rearwardly from the bar *a* and mounted thereon in any convenient manner are the baiters, comprising a number of preferably flexible trailers *e*, each having one or more hooks *f*, which are preferably constructed in the form of a minature grapple, which form offers the greatest number of chances for catching the mussels. A tow-line *g* is secured to the rod *a* in any convenient and suitable manner.

In operating to secure a catch a number of the devices are arranged in a boat in any convenient manner to keep them from tangling, and one of them is thrown over the stern and towed along the bottom, the boat being allowed to drift downstream with the current. As the grapples *f* of the baiters strike between the open shells of the feeding mussels they are grasped thereby and dragged along the bottom in the wake of the drifting boat. After a time long enough to insure a good catch the device is hauled inboard with the mussels attached thereto and another thrown over in its place, and so on.

The object of placing wheels on the bar $a$ is so that the bar may easily pass over all mussels in the path of the baiters, and thus have this portion of the device the first object to touch them to cause a closure of their shells. If the bars were dragged along the ground without being lifted in some manner, all mussels which it touched would immediately close their shells, and the baiters would prove practically useless. By mounting the bar $a$ so that it rides a distance from the ground the catch is more than doubled and a very efficient device is obtained.

Obviously some features of the invention may be used without others, and therefore it is not to be understood as limited to the exact details of construction and arrangement of parts as herein described and illustrated, as manifestly it may be embodied in varying forms to suit various conditions of use without departing from its spirit. The right is therefore reserved to all such variations and modifications as properly fall within the scope of the invention and the terms of the following claims.

We claim—

1. A device for catching shell-fish comprising a body portion mounted to ride a distance from the ground, and baiters attached thereto so as to trail rearwardly when said body portion is moved, substantially as described.

2. A device for catching shell-fish comprising a body portion and a baiter attached thereto comprising a trailer and a suitable engaging means secured thereon, substantially as described.

3. A device for catching shell-fish comprising a body portion mounted to ride a distance from the ground and a baiter attached thereto comprising a trailer and suitable engaging means secured thereon, substantially as described.

4. A device for catching shell-fish comprising a body portion mounted on wheels and a baiter attached thereto comprising a trailer and suitable engaging means secured thereon, substantially as described.

5. A device for catching shell-fish comprising a body portion mounted on wheels and a baiter attached thereto comprising a flexible trailer and a hook secured thereon, substantially as described.

6. A device for catching shell-fish comprising a body portion mounted to ride a distance from the ground, baiters attached thereto comprising trailers each having hooks secured thereon, and means for dragging said device through the water, substantially as described.

7. A device for catching shell-fish comprising a body portion mounted on wheels, baiters attached thereto comprising flexible trailers each having grapple-hooks secured thereon, and a tow-line for dragging said device through the water, substantially as described.

In testimony whereof we affix our signatures in presence of two witnesses.

WILLIAM W. SHELBY.
DORELL W. CUMMINGS.

Witnesses:
J. STANLEY SPOEHR,
ROBT. L. McGRAW.